US010668806B2

(12) United States Patent
Morgan et al.

(10) Patent No.: US 10,668,806 B2
(45) Date of Patent: Jun. 2, 2020

(54) CONCRETE TRANSIT MIXER

(71) Applicant: CalPortland Company, Glendora, CA (US)

(72) Inventors: Daryl Morgan, Mesa, AZ (US); Louis Mizner, Surprise, AZ (US); William Hamblen, Glendale, AZ (US)

(73) Assignee: CalPortland Company, Glendora, CA (US)

( * ) Notice: Subject to any disclaimer, the term of this patent is extended or adjusted under 35 U.S.C. 154(b) by 640 days.

(21) Appl. No.: 15/424,514

(22) Filed: Feb. 3, 2017

(65) Prior Publication Data

US 2018/0222085 A1   Aug. 9, 2018

(51) Int. Cl.
| | |
|---|---|
| *B01F 9/02* | (2006.01) |
| *B28C 5/42* | (2006.01) |
| *B60P 3/16* | (2006.01) |
| *B60K 15/063* | (2006.01) |
| *B60R 3/00* | (2006.01) |
| *B62D 33/06* | (2006.01) |

(52) U.S. Cl.
CPC .......... *B60K 15/063* (2013.01); *B28C 5/4203* (2013.01); *B28C 5/4296* (2013.01); *B60P 3/16* (2013.01); *B60R 3/00* (2013.01); *B01F 2215/0047* (2013.01); *B60Y 2200/1422* (2013.01); *B62D 33/06* (2013.01)

(58) Field of Classification Search
None
See application file for complete search history.

(56) References Cited

U.S. PATENT DOCUMENTS

| | | |
|---|---|---|
| D181,998 S | 1/1958 | Prichard |
| 4,084,833 A | 4/1978 | Mohrbacker et al. |
| D249,665 S | 9/1978 | Silbernagel |
| 4,335,963 A | 6/1982 | Jameson et al. |
| D271,875 S | 12/1983 | Silbernagel |
| 4,428,677 A | 1/1984 | Schreiter, Jr. |
| 4,436,177 A * | 3/1984 | Elliston .............. B62D 33/0612 180/324 |
| D291,547 S | 8/1987 | Silbernagel |
| 4,892,345 A | 1/1990 | Rachael, III |
| 4,991,906 A * | 2/1991 | Fingerle ............. B62D 33/0612 280/164.1 |

(Continued)

FOREIGN PATENT DOCUMENTS

| | | | |
|---|---|---|---|
| CN | 103306201 B | 2/2015 | |
| EP | 1211162 A2 * | 6/2002 | ............. B62D 21/08 |

OTHER PUBLICATIONS

"1995 International 4700 Concrete Mixer | Pump Truck," 1st Image, Jun. 2016, URL=greensboro-nc.buysellsearch.com, download date Aug. 29, 2016, 2 pages.

(Continued)

*Primary Examiner* — Jennifer A Leung
(74) *Attorney, Agent, or Firm* — Seed IP Law Group LLP

(57) ABSTRACT

A concrete transit mixer can include a cabin having four doors for people to enter and exit the cabin, and a rotatable drum for mixing and pouring concrete. The mixer can include a water tank mounted below the cabin and a fuel tank mounted below the cabin. The mixer can include four distinct sets of steps to allow people to climb up to each of the four doors to enter the cabin.

6 Claims, 3 Drawing Sheets

(56) References Cited

U.S. PATENT DOCUMENTS

| | | | |
|---|---|---|---|
| 5,251,722 A * | 10/1993 | Scratchard | B28C 5/422 |
| | | | 180/321 |
| 5,498,021 A | 3/1996 | Christenson | |
| D423,409 S | 4/2000 | Silbernagel | |
| 6,189,901 B1 * | 2/2001 | Smith | B60G 9/00 |
| | | | 180/209 |
| D500,506 S | 1/2005 | Simpson et al. | |
| D500,771 S | 1/2005 | Simpson et al. | |
| 7,530,403 B2 | 5/2009 | Cano | |
| 7,931,397 B2 * | 4/2011 | Lindblom | B28C 5/4213 |
| | | | 220/563 |
| D860,262 S * | 9/2019 | Morgan | D15/19 |
| 2004/0065357 A1 | 4/2004 | Burch | |
| 2006/0263185 A1 * | 11/2006 | Glenn | B60P 3/00 |
| | | | 414/498 |
| 2011/0058446 A1 | 3/2011 | Khouri | |
| 2013/0001983 A1 * | 1/2013 | Case | B62D 25/10 |
| | | | 296/190.01 |
| 2015/0029811 A1 | 1/2015 | Kawano et al. | |
| 2015/0202795 A1 | 7/2015 | Mcfarlane | |
| 2015/0246331 A1 | 9/2015 | Broker et al. | |
| 2015/0367300 A1 | 12/2015 | McNeilus et al. | |
| 2016/0199999 A1 | 7/2016 | Pirri et al. | |
| 2016/0221219 A1 | 8/2016 | Meldahl et al. | |
| 2017/0072916 A1 | 3/2017 | Beck, III et al. | |
| 2018/0004199 A1 * | 1/2018 | Randolph, III | G05D 1/0011 |

OTHER PUBLICATIONS

"1995 International 4700 Concrete Mixer | Pump Truck," $2^{nd}$ Image, Jun. 2016, URL=greensboro-nc.buysellsearch.com, download date Aug. 29, 2016, 2 pages.

"1995 International 4700 Concrete Mixer | Pump Truck," $3^{rd}$ Image, Jun. 2016, URL=greensboro-nc.buysellsearch.com, download date Aug. 29, 2016, 2 pages.

U.S. Appl. No. 29/592,956, filed Feb. 3, 2017, Mixer Truck with a Four Door Cab.

* cited by examiner

CONCRETE TRANSIT MIXER

BACKGROUND

Technical Field

The present disclosure relates generally to concrete transit mixers.

Description of the Related Art

Concrete transit mixers, sometimes referred to as concrete mixers, concrete mixing trucks, or concrete trucks, are well-known. Concrete transit mixers are often used to mix batched concrete as it is transported to a work site where it will be poured. Concrete transit mixers sometimes include a cabin at the front and a rotating drum, to hold and mix the batch, at the back.

BRIEF SUMMARY

A concrete transit mixer may be summarized as including a front end portion, a rear end portion, and a longitudinal axis extending horizontally from the front end portion to the rear end portion; an engine positioned at the front end portion along the longitudinal axis; a cabin positioned behind the engine along the longitudinal axis, the cabin including a driver's side, a passenger's side, a first driver's-side door, a second driver's-side door behind the first driver's-side door, a first passenger's-side door, and a second passenger's-side door behind the first passenger's-side door and having a capacity to accommodate at least four occupants of average adult size; a chassis; and a rotatable drum supported by the chassis at an inclined orientation and positioned behind the cabin along the longitudinal axis, the rotatable drum mounted on the chassis to rotate about an axis of rotation that extends from a front end of the rotatable drum to a rear end of the rotatable drum.

The concrete transit mixer may further include at least a first and a second seat positioned between the first driver's-side door and the first passenger's-side door; and at least a third and a fourth seat positioned between the second driver's-side door and the second passenger's-side door.

The concrete transit mixer may further include a first set of steps positioned below the first driver's-side door; a second set of steps distinct from the first set of steps positioned below the second driver's-side door; a third set of steps positioned below the first passenger's-side door; and a fourth set of steps distinct from the third set of steps positioned below the second passenger's-side door.

The concrete transit mixer may further include a water tank positioned below a rear portion of the driver's side of the cabin. The cabin may have a rear end, the water tank may have a front end and a rear end, the front end of the water tank may be aligned with a center of the second driver's-side door along the longitudinal axis and the rear end of the water tank is rearward of rear end of the cabin along the longitudinal axis.

The concrete transit mixer may further include an access panel built in to a floor of the cabin that can be opened to allow an operator to access controls for operating the water tank.

The concrete transit mixer may further include a fuel tank positioned below a front portion of the passenger's side of the cabin.

The concrete transit mixer may further include a first axle positioned under the engine; a second axle positioned rearward of the first axle along the longitudinal axis; a third axle positioned rearward of the second axle along the longitudinal axis; and exactly one pusher axle positioned between the first axle and the second axle along the longitudinal axis.

The concrete transit mixer may further include an access panel built in to a floor of the cabin that can be opened to allow an operator to access controls for operating the rotatable drum.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

Terms that refer to relative heights, e.g., above, below, upward, and downward, are used herein in accordance with their ordinary meanings with respect to a direction of gravity.

Concrete is generally formed by mixing cement, aggregate, and water in specific proportions, then pouring the mixture into formwork in a flowable state so that the mixture fills the formwork and hardens into solid concrete having a shaped defined by the interior surfaces of the formwork. The proportions of the cement, aggregate, water, and any supplementary materials in the original mixture influence many important properties of the hardened concrete, including its overall strength. Once cement, aggregate, and water are mixed, a chemical reaction begins to take place by which the mixture hardens into solid concrete. This chemical reaction can continue for days, weeks, months, or even years. Because the chemical reaction begins as soon as the cement, aggregate, and water are mixed, however, it is important to manage the hardening of the concrete prior to pouring, so that the mixture is still flowable when poured into the formwork.

Figure 1:
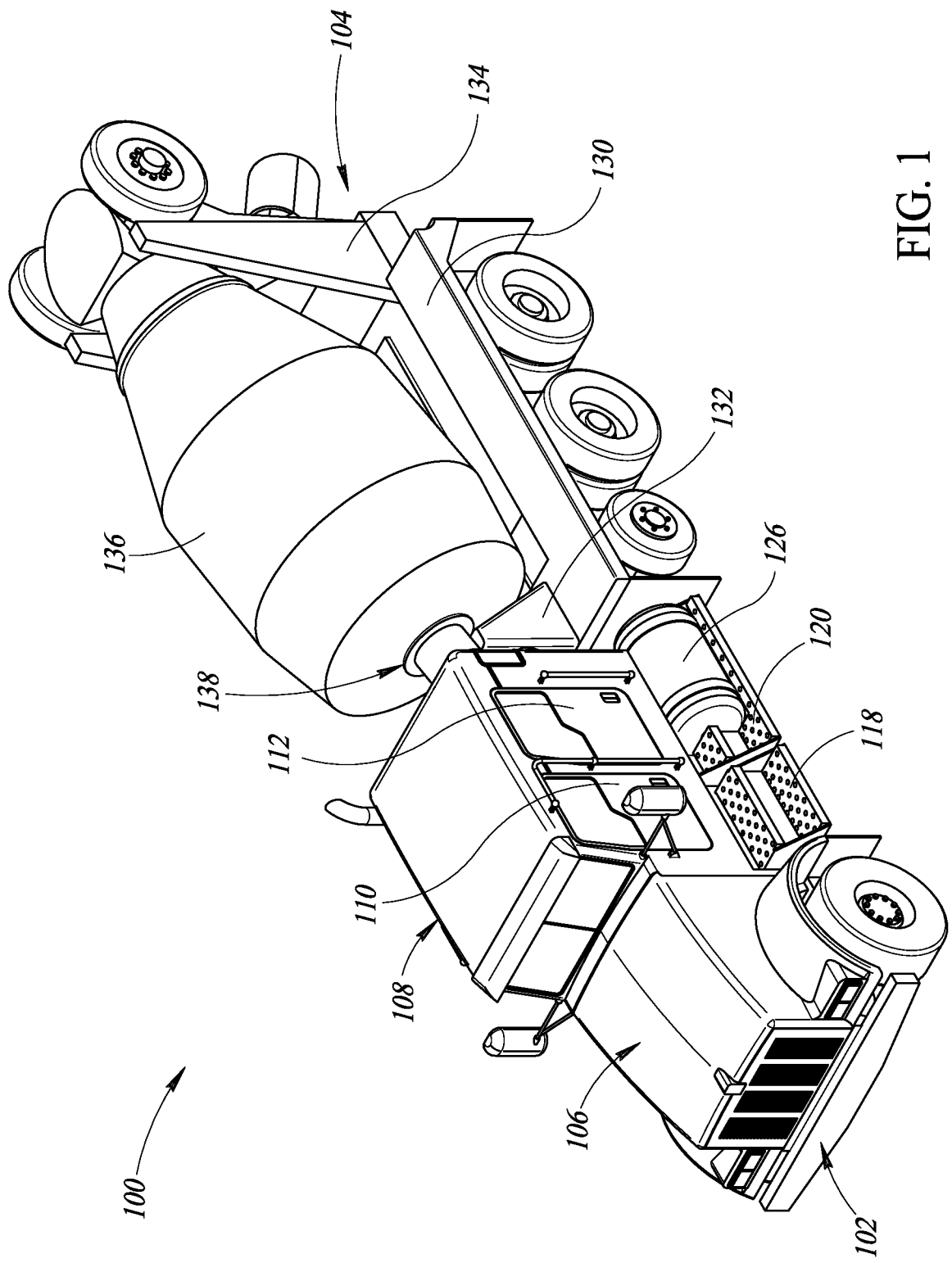
FIG. 1 is a perspective view of a concrete transit mixer, according to at least one illustrated embodiment.
Figure 2:
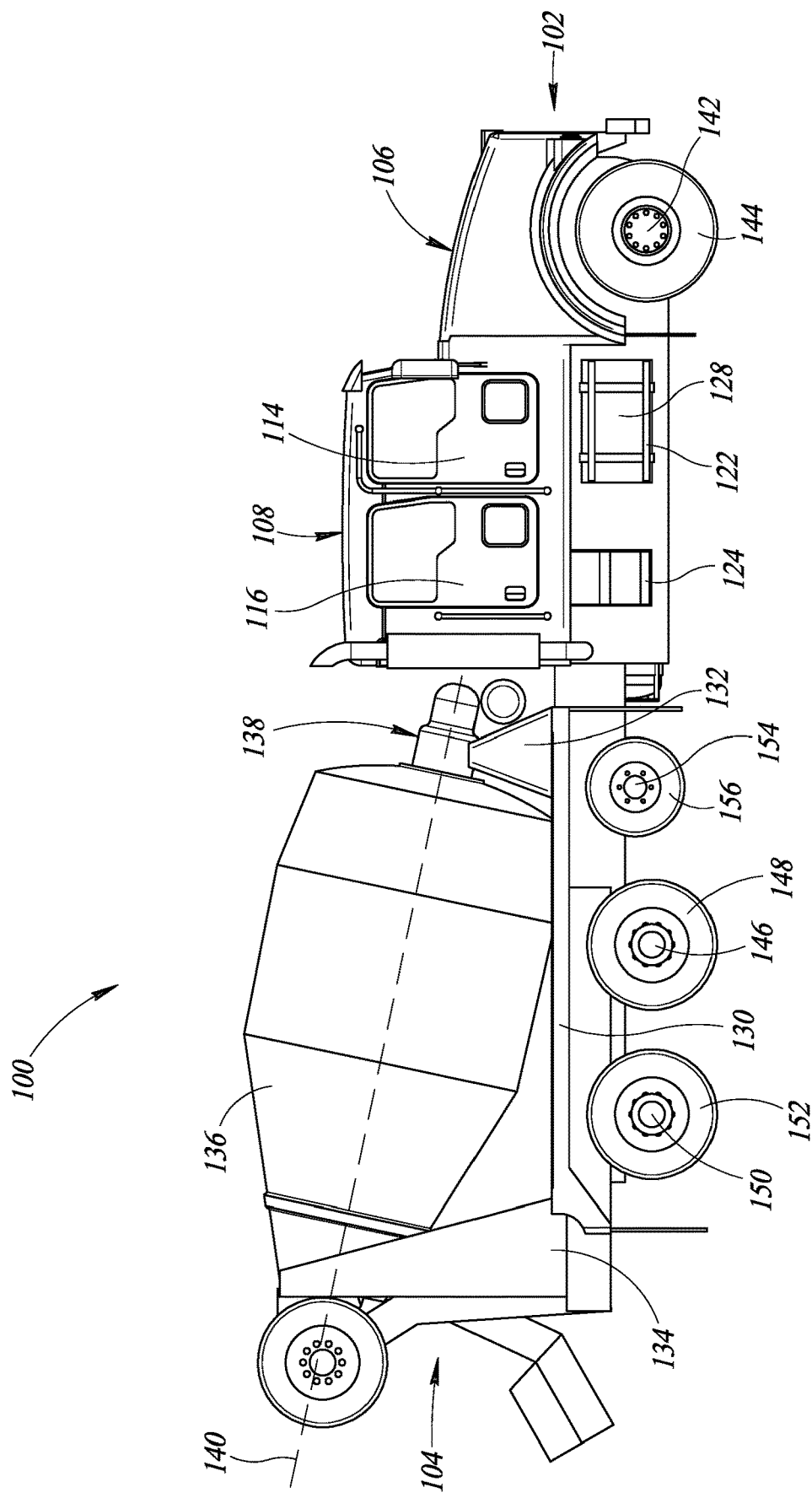
FIG. 2 is a right side view of the concrete transit mixer of FIG. 1.
Figure 3:
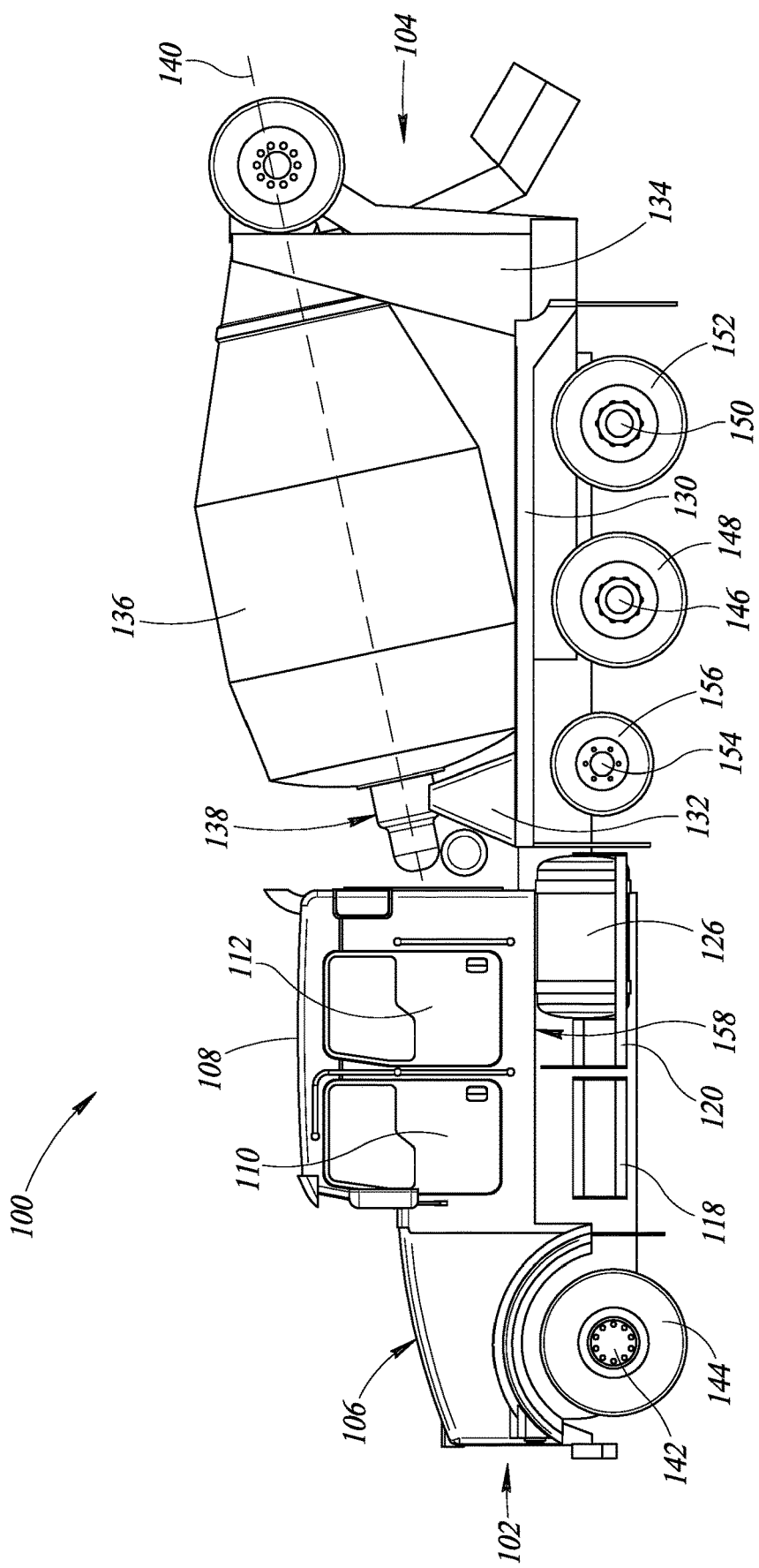
FIG. 3 is a left side view of the concrete transit mixer of FIG. 1.

FIG. 1 shows a concrete transit mixer 100 having a front end portion 102 and a rear end portion 104. At the front end portion 102, the concrete transit mixer 100 includes an engine 106 that can be used to power the mixer 100 and to drive the mixer 100 from one location to another. Located just behind the engine 106, the mixer 100 includes a cabin 108 that can house the driver or operator of the mixer 100, as well as several additional passengers.

In particular, in countries or regions that drive on the right side of the road, the cabin 108 includes four doors: a first, driver's door 110 located in the left side of the cabin 108, through which a driver or other person can enter the cabin 108; a second, passenger's door 112 located in the left side of the cabin 108 just behind the first, driver's door 110, and through which a passenger or other person can enter the cabin 108; a third, passenger's door 114 located in the right side of the cabin 108 across the cabin 108 from the first, driver's door 110, and through which a passenger or other person can enter the cabin 108; and a fourth, passenger's door 116 located in the right side of the cabin 108 across the cabin 108 from the second, passenger's door 112 and just behind the third, passenger's door 114, and through which a passenger or other person can enter the cabin 108. In countries or regions that drive on the left side of the road, the cabin 108 can include the same four doors with the locations of the first, driver's door 110 and the third, passenger's door 114 switched.

Two or more seats, or a row seat configured to seat two or more people, are positioned between the first and third doors 110, 114, and two or more seats, or a row seat configured to seat two or more people, are positioned between the second and fourth doors 112, 116. A first set of steps or stairs 118 is coupled to the cabin 108 just below the first door 110, to allow a person to climb up into the cabin 108 through the first door 110. A second set of steps or stairs 120, which is distinct from and not directly coupled to the first set of stairs 118, is coupled to the cabin 108 just below the second door 112, to allow a person to climb up into the cabin 108 through the second door 112. A third set of steps or stairs 122 is coupled to the cabin 108 just below the third door 114, to allow a person to climb up into the cabin 108 through the third door 114. A fourth set of steps or stairs 124, which is distinct from and not directly coupled to the third set of stairs 122, is coupled to the cabin 108 just below the fourth door 116, to allow a person to climb up into the cabin 108 through the fourth door 116.

The mixer 100 includes a water tank 126 positioned just below a first side of the cabin 108 behind, inboard of, adjacent to, or integrated with one of the sets of stairs 118, 120, 122, or 124. In the illustrated embodiment, the water tank 126 is positioned under a rear portion of the left side (i.e., the driver's side) of the cabin 108 below the second door 112, such that a front end of the water tank 126 is aligned vertically with a center of the second door 112 and such that a rear end of the water tank 126 is positioned rearward of the rear end of the cabin 108. The mixer 100 also includes a fuel tank 128 positioned just below a second side of the cabin 108 opposite to the first side, behind, inboard of, adjacent to, or integrated with one of the sets of stairs 118, 120, 122, or 124. In the illustrated embodiment, the fuel tank 128 is positioned under a front portion of the right side (i.e., the passenger's side) of the cabin 108 below the third door 114.

Located just behind the cabin 108, the mixer 100 includes at least a portion of a truck chassis 130 that supports various components of a concrete mixing apparatus. For example, the mixer 100 includes a front support bracket or front stand 132 mounted on top of the chassis 130 just behind the cabin 108. As another example, the mixer 100 includes a rear support bracket or rear stand 134 mounted on top of and near the rear end of the chassis 130, so it is spaced apart from and positioned behind the front stand 132. The rear stand 134 is taller than the front stand 132, such as by a factor of about three.

The mixer 100 also includes a large rotatable drum 136 rotatably mounted to top end portions of the front and rear stands 132, 134. For example, the drum 136 is rotatably mounted to a top end of the front stand 132 by an actuator 138 positioned at the top of the front stand 132 just behind the cabin 108. The actuator 138 can be used by an operator to actuate rotation of the drum 136 about its own central longitudinal axis 140, such that the drum 136 is rotatable with respect to the rest of the mixer 100. Because the rear stand 134 is significantly taller than the front stand 132, the central longitudinal axis 140 of the drum 136 is oriented to extend upward toward the rear end portion 104 of the mixer 100 and downward toward the front end portion 102 of the mixer 100.

The rotatable drum 136 is generally barrel-shaped and includes a single opening at its top, rear end, through which cement, water, and aggregate can be loaded into the drum 136, and through which mixed cement, water, and aggregate can be unloaded or poured out of the drum 136. The drum 136 can include internal features such as fins or blades that assist in agitating the mixture in the drum 136 as the drum 136 rotates. As one example, these internal features can include an Archimedes-type spiral screw or auger that can be turned in a first direction during loading and transit to carry the mixture downward and forward in the drum 136 to cause agitation, and that can be turned in a second direction opposite to the first direction during unloading to carry the mixture upward and rearward toward the single opening so it can be poured out of the opening into formwork at a job site.

The water tank 126 is coupled by a set of pipes, hoses, and/or valves to the drum 136, so that an operator can add water to the mixture of cement, aggregate and water being mixed within the drum 136 to influence the course of the chemical reaction and generally to increase the flowability of the mixture prior to pouring. The mixer 100 includes an access panel 158 built in to the floor of the cabin 108 just inboard of the second door 112, which can be opened to allow an operator to access some of the pipes, hoses, and/or valves coupled to the water tank 126 below the cabin 108, and which can be closed to allow passengers to safely and comfortably sit or stand in the cabin 108.

Because the opening in the drum 136 is located at the rear end portion 104 of the mixer 100, the mixer 100 can be referred to as a rear-discharge concrete transit mixer 100, and the mixer 100 can be operated by two operators to pour concrete, including a first operator seated in the cabin 108 to drive the mixer 100 as needed, and a second operator positioned at the rear end portion 104 of the mixer to control the pouring of the concrete from the opening at the rear end portion 104 of the mixer. In alternative embodiments, any of the features described herein can be used with a frontdischarge concrete transit mixer instead, which can be operated by a single operator, if desired.

The mixer 100 also includes an access panel built in to the floor of the cabin 108, which can be opened to allow an operator to access controls for operating the drum 136, and which can be closed to allow passengers to safely and comfortably sit or stand in the cabin 108. In some cases, this access panel is distinct from the access panel 158, while in other cases, this access panel is the access panel 158 and the access panel 158 provides access to both controls for operating the water tank 126 and controls for operating the drum 136.

The mixer 100 can include a variety of different wheel and axle configurations, which can depend upon the desired weight capacity of the mixer 100, local regulations regarding vehicle weight and axle configurations, and/or the quality of roadways the mixer 100 is designed to traverse. In the illustrated embodiment, the mixer 100 includes a first, front axle 142 coupled to a first set of wheels 144, positioned directly under the engine 106 at the front end portion 102 of the mixer 100. The mixer 100 also includes a second, middle axle 146 coupled to a second set of wheels 148, positioned directly under the truck chassis 130 rearward of the front stand 132, and a third, rear axle 150 coupled to a third set of wheels 152, positioned directly under the truck chassis 130 rearward of the middle axle 146. The mixer 100 also includes a single (i.e., exactly, or no more than, one) pusher axle 154 coupled to a fourth set of wheels 156 positioned directly under the truck chassis 130 forward of the middle and rear axles 146, 150.

The mixer 100 provides advantages over previous concrete transit mixers. The relatively large cabin 108 allows at least four people to comfortably enter, exit, and ride in the mixer 100 from one location to another. The mixer 100 accomplishes this while retaining ease of access to pipes, tubes, and/or valves coupling the water tank 126 to the drum 136, and without detracting from the overall weight distribution and balance of the mixer 100.

Aspects of the various embodiments described above can be combined or modified to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A concrete transit mixer, comprising:
    a front end portion, a rear end portion, and a longitudinal axis extending horizontally from the front end portion to the rear end portion;
    an engine positioned at the front end portion along the longitudinal axis;
    a cabin positioned behind the engine along the longitudinal axis, the cabin including a driver's side, a passenger's side, a first driver's-side door, a second driver's-side door behind the first driver's-side door, a first passenger's-side door, and a second passenger's-side door behind the first passenger's-side door and having a capacity to accommodate at least four occupants of average adult size;
    a chassis;
    a rotatable drum supported by the chassis at an inclined orientation and positioned behind the cabin along the longitudinal axis, the rotatable drum mounted on the chassis to rotate about an axis of rotation that extends from a front end of the rotatable drum to a rear end of the rotatable drum;
    a water tank positioned below a rear portion of the driver's side of the cabin; and
    a fuel tank positioned below a front portion of the passenger's side of the cabin;
    wherein the cabin has a rear end, the water tank has a front end and a rear end, the front end of the water tank is aligned with a center of the second driver's-side door along the longitudinal axis and the rear end of the water tank is rearward of the rear end of the cabin along the longitudinal axis.

2. The concrete transit mixer of claim 1, further comprising:
    at least a first and a second seat positioned between the first driver's-side door and the first passenger's-side door; and
    at least a third and a fourth seat positioned between the second driver's-side door and the second passenger's-side door.

3. The concrete transit mixer of claim 1, further comprising:
    a first set of steps positioned below the first driver's-side door;
    a second set of steps distinct from the first set of steps positioned below the second driver's-side door;
    a third set of steps positioned below the first passenger's-side door; and
    a fourth set of steps distinct from the third set of steps positioned below the second passenger's-side door.

4. The concrete transit mixer of claim 1, further comprising:
    an access panel built in to a floor of the cabin that can be opened to allow an operator to access controls for operating the water tank.

5. The concrete transit mixer of claim 1, further comprising:
    a first axle positioned under the engine;
    a second axle positioned rearward of the first axle along the longitudinal axis;
    a third axle positioned rearward of the second axle along the longitudinal axis; and
    exactly one pusher axle positioned between the first axle and the second axle along the longitudinal axis.

6. The concrete transit mixer of claim 1, further comprising:
    an access panel built in to a floor of the cabin that can be opened to allow an operator to access controls for operating the rotatable drum.

* * * * *